US007822924B2

(12) United States Patent
Woffinden et al.

(10) Patent No.: US 7,822,924 B2
(45) Date of Patent: Oct. 26, 2010

(54) PROCESSING OF SELF-MODIFYING CODE IN MULTI-ADDRESS-SPACE AND MULTI-PROCESSOR SYSTEMS

(75) Inventors: Gary A. Woffinden, Overland Park, KS (US); Paul T. Leisy, Grants Pass, OR (US); Ronald N. Hilton, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 12/113,131

(22) Filed: Apr. 30, 2008

(65) Prior Publication Data
US 2008/0301369 A1 Dec. 4, 2008

Related U.S. Application Data

(63) Continuation of application No. 11/254,290, filed on Oct. 19, 2005, now Pat. No. 7,386,670.

(60) Provisional application No. 60/620,364, filed on Oct. 19, 2004.

(51) Int. Cl.
*G06F 12/00* (2006.01)
(52) U.S. Cl. .............................. 711/125; 711/E12.078
(58) Field of Classification Search ........................ None
See application file for complete search history.

(56) References Cited

U.S. PATENT DOCUMENTS

| | | | |
|---|---|---|---|
| 5,964,884 A | 10/1999 | Partovi et al. | |
| 6,721,813 B2 * | 4/2004 | Owen et al. | 710/6 |
| 7,051,175 B2 * | 5/2006 | Vo | 711/163 |
| 7,254,806 B1 | 8/2007 | Yates, Jr. et al. | |
| 2003/0093775 A1 | 5/2003 | Hilton | |
| 2004/0015675 A1 * | 1/2004 | Kyker et al. | 711/207 |
| 2005/0075926 A1 * | 4/2005 | Liu et al. | 705/14 |

OTHER PUBLICATIONS

Notification of Transmittal of the International Search Report and the Written Opinion of the International Searching Authority, or the Declaration; PCT/US2005/037787.
"Reduction of Cache Coherence Traffic in MP Systems Via Large Block Authority", IBM Technical Disclosure Bulletin, Armonk, NY, US, vol. 33, No. 2, Jul. 1990; pp. 398-406.

* cited by examiner

*Primary Examiner*—Matt Kim
*Assistant Examiner*—Hamdy S Ahmed
(74) *Attorney, Agent, or Firm*—Steven Chiu, Esq.; Kevin P. Radigan, Esq.; Heslin Rothenberg Farley & Mesiti P.C.

(57) ABSTRACT

A method and system of storing to an instruction stream with a multiprocessor or multiple-address-space system is disclosed. A central processing unit may cache instructions in a cache from a page of primary code stored in a memory storage unit. The central processing unit may execute cached instructions from the cache until a serialization operation is executed. The central processing unit may check in a message queue for a notification message indicating potential storing to the page. If the notification message is present in the message queue, cached instructions from the page are invalidated.

26 Claims, 4 Drawing Sheets

PROCESSING OF SELF-MODIFYING CODE IN MULTI-ADDRESS-SPACE AND MULTI-PROCESSOR SYSTEMS

RELATED APPLICATIONS

This application is a continuation of patent application Ser. No. 11/254,290 filed on Oct. 19, 2005, further claims the benefit of priority to Patent Application Ser. No. 60/620,364, filed on Oct. 19, 2004. Foreign file Application Serial No. PCT/US2005/037787 filed on Oct. 19, 2005 also claims the benefit of priority to Patent Application Ser. No. 60/620,364, filed on Oct. 19, 2004.

BACKGROUND

The present invention relates to caching the memory of a computer system and, in particular, to a cache with a temporal-spatial organization.

Many legacy architectures, such as S/390, permit the program to be self-modifying, meaning that a program may store into its own code, thus altering itself dynamically. This behavior is referred to as Storing To the Instruction Stream (STIS). Even architectures that do not directly facilitate dynamic code self-modification must still provide a means for flushing cached instructions whenever new code is loaded into memory, to maintain instruction cache coherency.

While methods do exist for handling STIS in the straightforward single-address-space single-processor case, the present invention addresses the additional complexity when multiple virtual address spaces and/or processors are involved. One such method for handling STIS in a single-processor case is described in U.S. patent application Ser. No. 09/992,130, filed on Nov. 14, 2001, and titled, "Processing of Self-Modifying Code under Emulation." The disclosure of this application, published on May 15, 2003 as Published Application No. 20030093775 is herein incorporated by reference.

SUMMARY OF THE INVENTION

A method and system of storing to an instruction stream with a multiprocessor or multiple-address-space system is disclosed. A central processing unit may cache instructions in a cache from a page of primary code stored in a memory storage unit. The central processing unit may execute cached instructions from the cache until a serialization operation is executed. The central processing unit may check in a message queue for a notification message indicating potential storing to the page. If the notification message is present in the message queue, cached instructions from the page are invalidated.

DETAILED DESCRIPTION

A method and system of storing to an instruction stream with a multiprocessor system is disclosed. A first central processing unit may cache instructions in a first cache from a first page of primary code stored in a memory storage unit. The first central processing unit may execute cached instructions from the first cache until a serialization operation is executed. The first central processing unit may check in a first message queue for a first notification message indicating potential storing to the first page. If the first notification message is present in the first message queue, cached instructions from the first page are invalidated. The proposed techniques may be applied to either a hardware cache or a just in time translation-based software cache. In the latter case, translation of the code is performed after the code is fetched and before caching.

Figure 1:
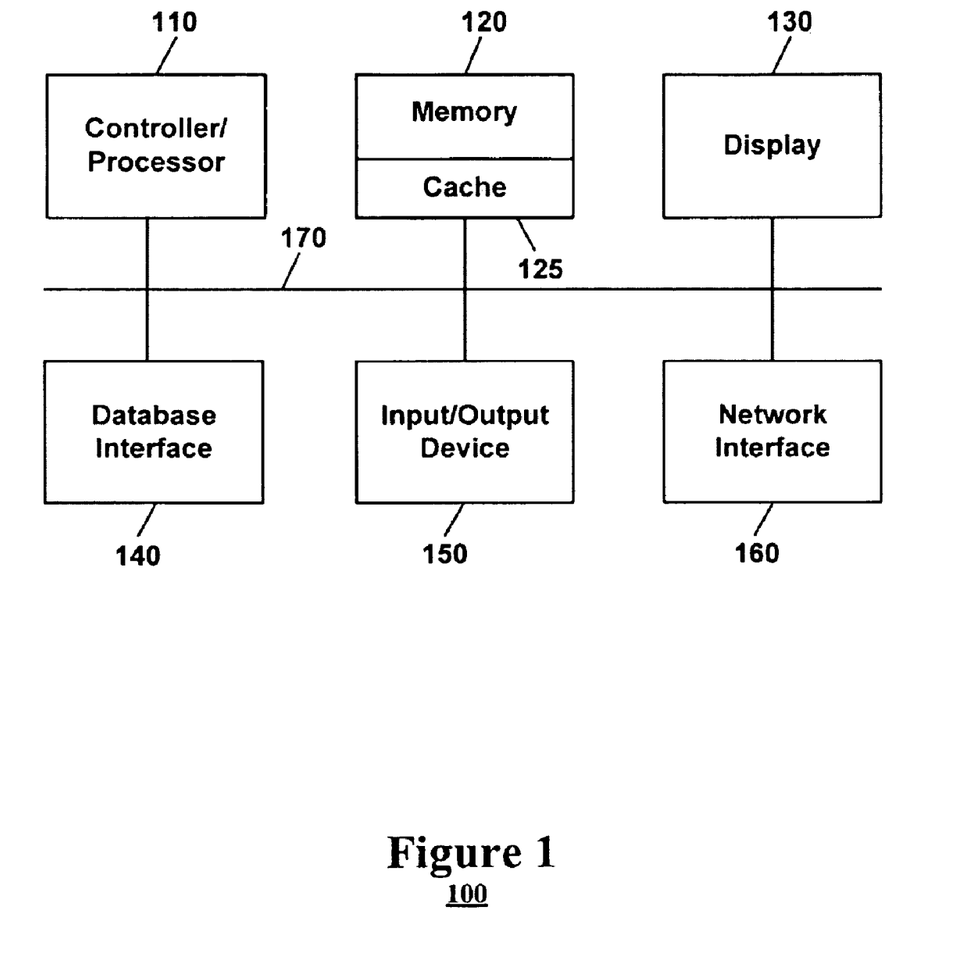
FIG. 1 is a diagram of a possible configuration of a computer system to execute the present invention.

FIG. 1 illustrates a possible configuration of a computer system 100 to execute the present invention. The computer system 100 may include a controller/processor 110 and a memory 120. The computer system 100 may also include display 130, database interface 140, input/output device interface 150, and network interface 160, connected through bus 170.

The controller/processor 110 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The Input/Output interface 150 may be connected to one or more input devices that may include a keyboard, mouse, pen-operated touch screen or monitor, voice-recognition device, or any other device that accepts input. The Input/Output interface 150 may also be connected to one or more output devices, such as a monitor, printer, disk drive, speakers, or any other device provided to output data.

The memory 120 may include volatile and nonvolatile data storage, including one or more electrical, magnetic or optical memories such as a RAM, cache, hard drive, CD-ROM drive, tape drive or removable storage disk. The memory may have a caching system 125 for speeding access to various memory data entries.

The network interface 160 may be connected to a communication device, modem, network interface card, or any other device capable of transmitting and receiving signals over a network 130. The components of the computer system 100 may be connected via an electrical bus 170, for example, or linked wirelessly.

Client software and databases may be accessed by the controller/processor 110 from memory 120 or through the database interface 140, and may include, for example, database applications, word processing applications, the client side of a client/server application such as a billing system, as well as components that embody the decision support functionality of the present invention. The computer system 100 may implement any operating system, such as Windows or UNIX, for example. Client and server software may be written in any programming language, such as ABAP, C, C++, Java or Visual Basic, for example.

Figure 2:
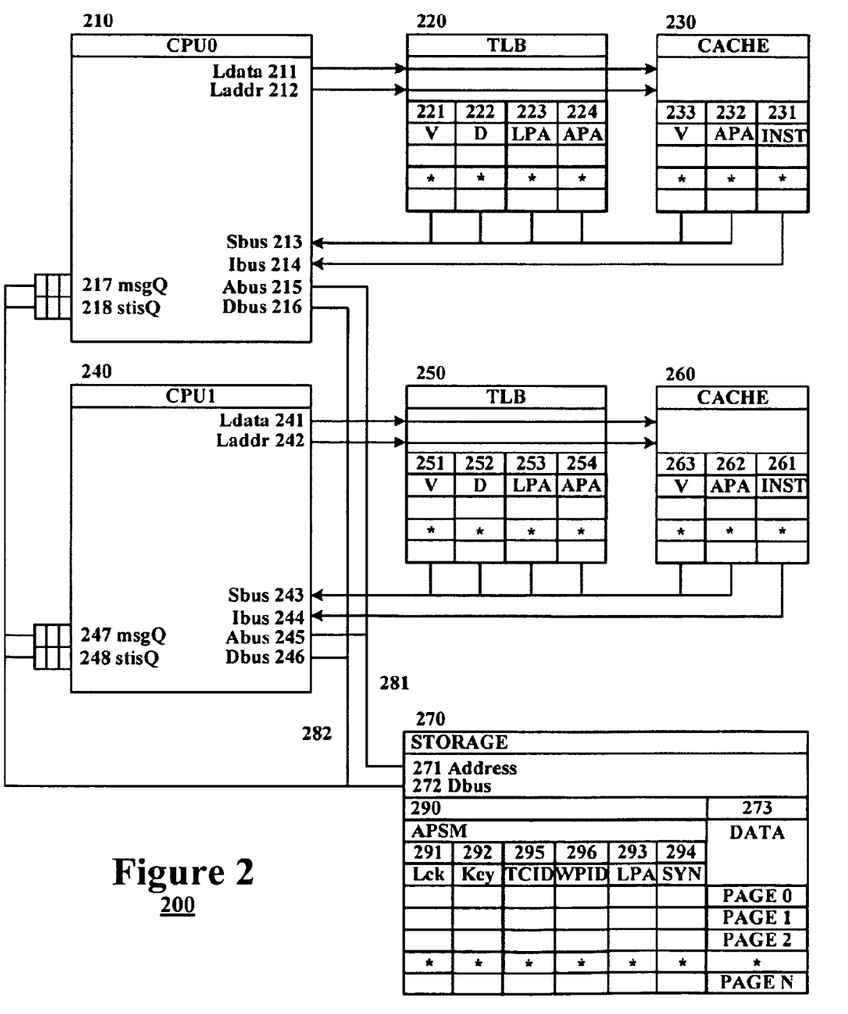
FIG. 2 is a diagram of one embodiment of a multi-processor system with STIS messaging.

FIG. 2 illustrates in a block diagram one embodiment of a system 200 capable of processing self-modifying code. A first central processing unit (CPU0) 210 associated with a first translation lookaside buffer (TLB) 220 and a first instruction cache 230 and a second central processing unit (CPU1) 240 associated with a second TLB 250 and a second instruction cache 260 may access a memory storage 270. Although the system 200 of FIG. 2 shows CPU0 210 and CPU1 240, the system may have more than two processors.

In one embodiment, CPU0 210 may have a local data bus (Ldata) 211 and local address bus (Laddr) 212 to provide data and address values to the TLB 220 and instruction cache 230 and CPU1 240 may have a Ldata 241 and Laddr 242 to provide data and address values to the TLB 250 and instruction cache 260. CPU0 210 may have a status bus (Sbus) 213 to receive status information from the TLB 220 and instruction cache 230 and an instruction data bus (Ibus) 214 to receive instructions from the instruction cache 230. CPU1 240 may also have a Sbus 243 to receive status information from the TLB 250 and instruction cache 260 and an Ibus 244 to receive instructions from the instruction cache 260.

The system 200 may include a system address bus (Abus) 281 to transmit memory addresses from CPU0 210 through pin 215 and from CPU1 240 through pin 245 to the memory storage 270 via address pin 271. The system 200 may include a system data bus (Dbus) 282 to transmit between CPU0 210 through pin 216, and CPU1 240 through pin 246, to memory storage 270 via data pin 272 and to CPU message queues (msgQ) via pins 217 and 247 and CPU STIS queues (stisQ) via pins 218 and 248.

The first TLB 220 may have entries with a valid field 221 to indicate whether the TLB entry contains a valid mapping and a dirty bit 222 which must be set to one to allow CPU0 210 to store to the corresponding page. The TLB 220 may have entries indexed by a subset of a logical page address from Laddr 211. Each entry associates a logical page address (LPA) 223 with a corresponding absolute page address (APA) 224. Additionally, the second TLB 250 may have entries with a valid field 251 to indicate whether the TLB entry contains a valid mapping and a dirty bit 252 which must be set to one to allow CPU0 240 to store to the corresponding page. The TLB 250 may have entries indexed by a subset of a logical page address from Laddr 241. Each entry associates a logical page address (LPA) 253 with a corresponding absolute page address (APA) 254.

In one embodiment, the CPU0 210 may respond with a TLB DIRTY BIT fault if a store is attempted to a page which has a valid TLB entry with a dirty bit 222 set to zero. The CPU0 210 may access the TLB 240 by placing a subset of the requesting LPA on Laddr 211 which selects an entry in the TLB 220 which returns the data from the selected entry to the CPU 210 via the Sbus 213. The CPU0 210 may determine whether the selected TLB entry data 223 matches the requesting LPA. If there is a match, then the selected TLB entry APA data 224 is the APA corresponding to the requesting LPA. If there is no match, the CPU0 210 may translate the requesting LPA 223 to the corresponding APA 224 using system translation tables and save the resulting mapping in the TLB 220.

CPU0 210 may cache instructions 231 derived from code in memory 270 in a first instruction cache 230. The first instruction cache 230 may have entries containing the APA 232 at which the instruction 231 is stored in memory 270. The first instruction cache 230 may have entries with a valid field 233 to indicate whether the cache entry contains a valid instruction. CPU1 240 may cache instructions 261 derived from code in memory 270 in a second instruction cache 260. The second instruction cache 260 may have entries containing the APA 262 at which the instruction 261 is stored in memory 270. The second instruction cache 260 may have entries with a valid field 263 to indicate whether the cache entry contains a valid instruction.

Depending on the particular system design, data 273 from memory 270 may be copied into the instruction cache 230 or translated into horizontal microcode or emulation code before being stored into the instruction cache 230. To insure instruction cache coherency, the CPU0 210 may purge stale cached instructions when architecturally required if the code in memory is modified. For example, within a CPU, the IBM S/390 architecture specifies that if a store instruction modifies the next sequential instruction in memory, the CPU may be required to execute the modified instruction. The IBM S/390 architecture further defines serialization events which require a CPU to logically discard prefetched instructions, thereby requiring the CPU to recognize code modified by other CPUs. For example, interruptions and certain instructions may be defined as serialization events.

An absolute pages storage map (APSM) 290 may be implemented in memory 270 which includes one entry per physical page of memory. The APSM 290 may have a lock field (LCK) 291 and a key field 292 (KEY) 292.

In one embodiment, each APSM entry may have a LPA field 293 to associate the absolute page address with a logical page address. If the operating system concurrently maps more than one virtual store address to the same page, then a synonym (SYNM) field 294 is set in the corresponding APSM entry to indicate that the APSM entry cannot associate all concurrently-mapped LPAs to the corresponding APA. In an alternate embodiment, an APSM entry may have multiple LPA fields 293, to associate multiple logical page addresses with each absolute page address, setting the SYN field 294 when the number of concurrently-mapped logical addresses for a particular page exceeds the number of available LPAs.

The APSM 290 may have a Translation Cache Identifier (TCID) 295 and Write Permission Identifier (WPID) 296 to limit the number of CPUs that may participate in multiprocessor cache coherency operations. The TCID 295 may indicate which CPUs (if any) may contain cached instructions from the corresponding page in memory. The WPID 296 may indicate which CPUs have write permission for the corresponding page in memory. One implementation may be one bit per CPU for the TCID and one bit per CPU for the WPID. For this implementation, the corresponding TCID bit may be set when instructions are first cached by a CPU from a page and may be reset when the CPU no longer has any cached instructions from the page. Similarly, the corresponding WPID bit may be set when a CPU acquires write permission to the page (i.e. by inserting a valid TLB entry for the page with the dirty bit set) and may be reset when the CPU no longer has write permission (for example, either because the dirty bit is reset or the TLB entry is invalidated or displaced).

If there are many CPUs in a system, the number of bits required for the TCID 295 and WPID 296 may be reduced. The TCID 295 and WPID 296 bit count may be reduced to one plus the number of bits required to encode the number of CPUs. For example, a 127-CPU system may be implemented with one byte per TCID entry and one byte per WPID entry. If no CPU is registered, the byte may be set to zero. If only one CPU is registered, the CPU number (from 1 to 127) is encoded in the byte with the high-order bit set to 0. If there is more than one CPU, the high-order bit is set and the remaining bits form a modulo-7 bit map indicating groups of CPUs that may have cached instructions from the page. That is, for $0<=n<=7$, bit <n> represents CPU# n+1, n+8, n+15, etc. For a 127-CPU system, each bit represents 18 or 19 CPUs, depending on the bit position. For such a shared-bit implementation, if more than one CPU is registered, a bit is set by the first represented CPU requesting registration and can only be reset if none of the represented CPUs require registration.

The preferred implementation uses a shared-bit implementation and the TCID 295 and WPID 296 are cleared when the page is purged from all CPUs (for example, on IBM Z-architecture instructions invalidate page table entry (IPTE) or a compare and swap and purge (CSP) instruction).

The system 200 may perform at least three basic cache coherency operations. Inhibit STIS (INHB_STIS) ensures completion of prior stores to a page and resetting the write permission of remote CPUs. Report STIS (RPT_STIS) reflects potential STIS to a page cached by a remote processor and setting write permission for the CPU to the page. Check STIS (CHK_STIS) acts on potential STIS to purge potentially stale cached instructions from the cache at the architecturally-required points.

Figure 3A:
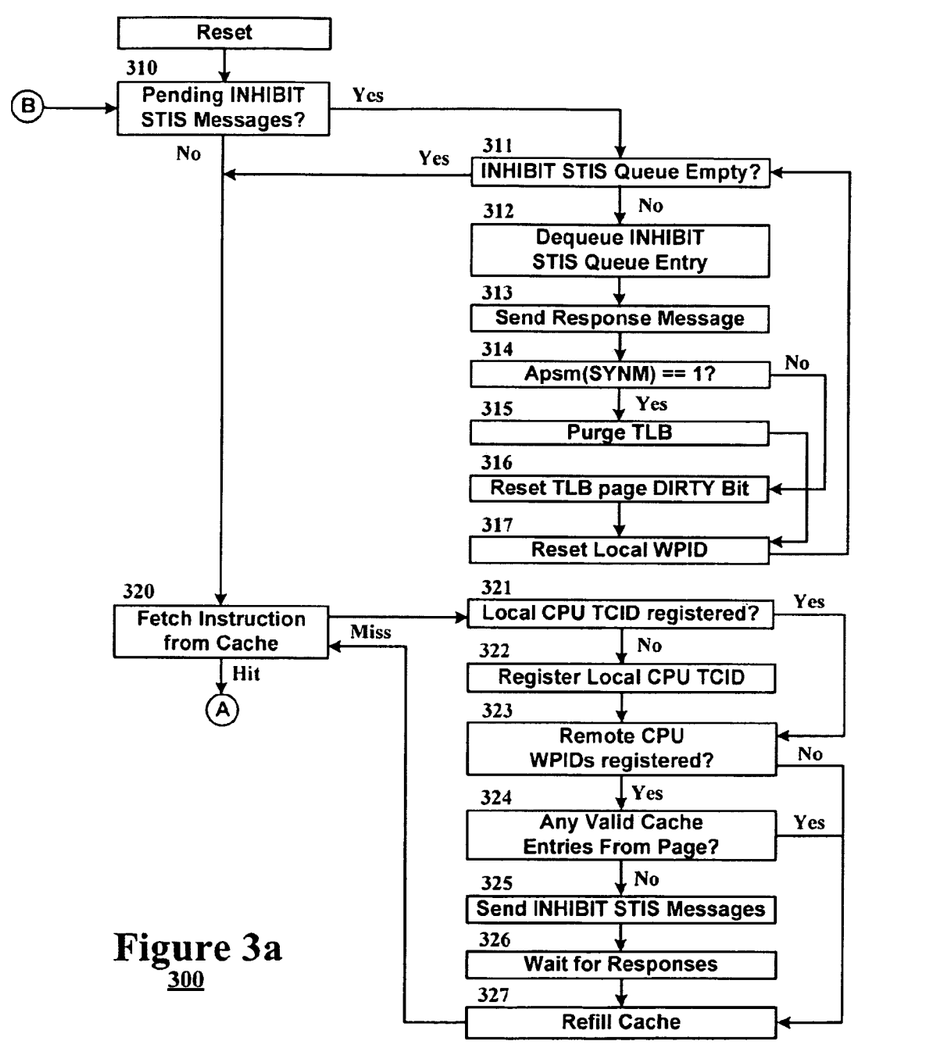
FIGS. 3a-b is a flowchart illustrating one embodiment of a method for a CPU performing a read to execute an INHB STIS operation.
Figure 3B:
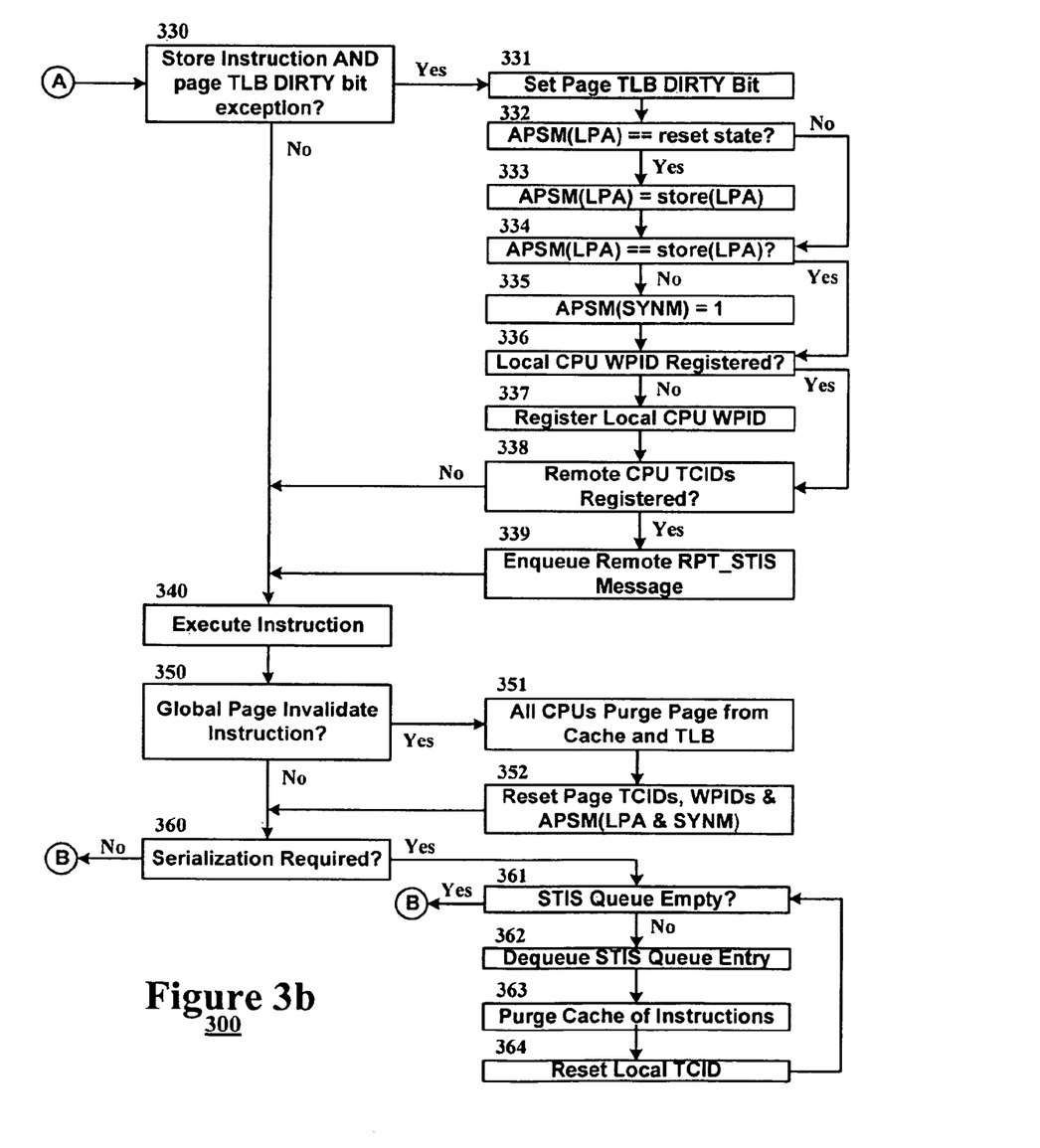

FIGS. 3a-b illustrates in a flowchart one embodiment of a method 300 for a CPU performing according to the present invention. As shown in FIG. 3a, the CPU0 210 may check the msgQ 217 (Block 310) and process any pending INHB_STIS messages (Blocks 311-317) from remote CPU1 240. A pending INHB_STIS message may be processed by queuing a response message to the sending CPU1 240 msgQ 247 timed so that any pending stores to the page will be visible to the sending CPU 240 before the response is visible and resetting the receiving CPU0 210 write permission to force the first subsequent store to the page 273 by the receiving CPU0 210 to experience a TLB DIRTY fault. In one embodiment, the msgQ 217 may be checked between units of instruction execution (Block 310) after stores from previous instruction executions (Block 340) have been completed on the receiving CPU 210. If there are pending INHBT_STIS messages in the msgQ 217 (Block 311), each message is dequeued (Block 312) and the absolute page address from the INHB_STIS message may be used to index into the APSM 290. The CPU0 210 may queue a response message to the sending CPU 240 (Block 313). If the SYN field 294 is set (Block 314), the receiving CPU 210 may have difficulty finding all associated logical page addresses and, for convenience, may purge the entire TLB 220 (Block 314). Alternately, the CPU0 may reset the dirty bit 222 for all TLB entries 220. If the SYN field 294 is not set (Block 313), the receiving CPU 210 uses the logical page address 293 from the APSM 290 to index into the TLB 220 and resets the dirty bit 222 for a matching TLB entry, if any (Block 315). The WPID field for CPU0 210 may be reset (Block 317). If the WPID 296 is a bit-per-CPU implementation, then the bit representing the CPU 210 in the WPID page entry 296 may be reset, since the CPU 210 no longer has write permission for the page. Similarly, if this CPU 210 is the only registered CPU in the shared-bit WPID implementation, the WPID 296 page entry may be cleared. Stores to the page from the CPU0 210 are inhibited until after CPU0 210 has processed a TLB DIRTY fault for the page (Blocks 330-339) including sending a RPT_STIS message to all TCID-registered CPUs.

A first CPU 210 may attempt to fetch instructions from the cache 230 (Block 320). If the requested instructions are not found in the cache 230, causing a miss (Block 320), the CPU0 210 may check the TCID 295 for the corresponding page (Block 321) and register the CPU0 210 in the TCID 295 page entry if not already registered (Block 322) to indicate that the CPU 210 is permitted to cache instructions from the memory page. The CPU0 210 may check for any remote CPUs 240 registered in the WPID 296 page entry (Block 323). If there are no remote CPUs 240 registered in the WPID 296 page entry, the CPU0 210 may refill the cache 230 with instructions translated from code stored from the page in memory 270 (Block 327).

If the WPID 296 page entry has remote CPUs 240 registered (Block 323), the CPU0 210 may check the local cache 230 for any other cached instructions from the page (Block 324) and if present, the CPU0 210 may refill the cache 230 with instructions translated from code stored in the page in memory 270 (Block 327). The presence of other cached instructions from the page may indicate that the CPU is already properly registered with the system to cache instructions for this page. If no other cached instructions from the page are present (Block 324), the CPU 210 queues an INHB_STIS message, which may include the absolute address, to each WPID-registered remote msgQ 247 (Block 325). The CPU0 210 may wait for responses from each WPID-registered remote CPU 240 (Block 326). Each WPID-registered remote CPU 240 processes the INHB_STIS message as described in Blocks 310-317. The response message to the CPU 210 may indicate that any prior stores to the page from the responding remote CPU 240 may be visible to the CPU 210. Any subsequent stores to the page from the responding remote CPU 240 may send a RPT_STIS message to the CPU 210. With the page thus properly registered with the system, the sending CPU 210 may refill the cache 230 with instructions translated from code stored in the page 273 in memory 270 (Block 327).

Once the cache 230 has been refilled with the requested instructions, the CPU 210 will succeed in fetching the instruction from the cache 230, causing a hit, and instruction execution begins (Block 340). Other fault checking not shown may occur during instruction execution (e.g. address exception, protection exception, translation exceptions, etc.) and are well understood in the art. As shown in FIG. 3b, if the instruction does not modify memory data 273, or if the dirty bit 222 for the page to be modified is already set, meaning that the CPU 210 had previously established write permission for the page, the algorithm will fall through the TLB DIRTY bit check (Block 330) and execute (Block 340). If the instruction modifies memory data 273 and the dirty bit 222 is not set (Block 330), the instruction may fault with a TLB DIRTY BIT fault. The CPU fault handler may set the dirty bit 222 (Block 331) and register the store LPA 293 in the APSM 290 (Blocks 342-345). If the LPA 293 is in the reset state (Block 332) signifying that no LPA 293 has been registered since the APSM 290 entry was last reset (Block 352), the store LPA may be saved in the LPA 293 of the APSM 290 (Block 333). The registered APSM (LPA) 293 may be compared to the store LPA (Block 334). If not equal (i.e. the absolute page has been modified since the last APSM entry reset (Block 352) using a different logical page address), the SYN field 294 may be set to indicate that there are multiple store LPAs which map to the current store APA (Block 335). The CPU0 210 may then register itself in the WPID 296 if it is not already registered (Blocks 336 & 337). If the TCID 295 has no registered remote CPUs 240 (Block 338), the instruction may be executed (Block 340). If the TCID 295 has a registered remote CPU 240 (Block 338), the CPU 210 queues a RPT_STIS message to each remote STISQ 248 registered in the TCID 295 before instruction execution completes (Block 339). Specifically, the RPT_STIS message may be made visible to TCID-registered remote CPUs 240 before the modified data from the store instruction is made visible.

In one embodiment, a unitary processor system may use the SYN 294 feature of the APSM 290 to perform STIS to multiple address spaces. In a TLB entry, a central processing unit (CPU) may map a first virtual address to an absolute address of a page stored in a memory storage unit. In an APSM entry, the CPU may map the absolute address with the first virtual address. A cache may cache instructions from the first page. The CPU may execute the cached instructions. In a second TLB entry, the CPU may map a second virtual address to the absolute address. The APSM may associate a synonym value with the APSM entry indicating whether the second virtual address matches the first virtual address. If a match is indicated by the associated synonym value, the CPU may use either TLB entry for detection of potential storing to instructions from the first page. If a match is not indicated by the associated synonym value, the CPU may invalidate every TLB entries from the first page or all the TLB entries upon storing to the first page using the second TLB entry. The CPU may also invalidate all the cache entries from the first page. The first TLB entry and the second TLB entry may be in a single TLB or in separate TLBs. The APSM entry may hold multiple virtual addresses. The synonym value may indicate whether a virtual address mapped in a TLB entry may not be stored in the APSM entry, as the APSM entry has filled all of its LPA positions with other entries.

In one embodiment, a shared-bit implementation for the TCID 295 and WPID 296 may be used so that TCID 295 and WPID 296 bits for a page are conveniently reset when an instruction purges a page from all CPUs in the system. When such a global page purge instruction is executed (Block 350), all CPUs in the system 200 may be signalled to purge the page from the caches and TLBs (Block 351). The TCID 295, WPID 296, LPA 293 and SYN 294 fields for the page may be reset by the executing CPU0 210 (Block 352). Following the reset, all CPUs are allowed to continue instruction execution.

Following instruction execution completion, (or for interruptible instructions, following a unit of operation boundary), the CPU0 210 may check for a pending serialization request (Block 360), required either by the current instruction or from any other serializing event. If a serializing request is pending, the CPU 210 may check the stisQ 212 (Block 361), dequeue each pending STIS_RPT message (Block 362) and delete all cached instructions from the page from the cache 230 (Block 363). If the TCID is a bit-per-CPU implementation, then the bit representing the CPU 210 in the TCID page entry 295 may be reset, since there are no longer any cached instructions from the page for this CPU. Similarly, if this CPU is the only registered CPU in the shared-bit TCID implementation, the TCID page entry 295 may be cleared.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. In a computer system, a method comprising:
caching instructions in a cache associated with a first processing unit of a plurality of processing units of the computer system from a page of primary code stored in a memory storage unit, the caching comprising modifying an entry of a table in the memory storage unit indicating which processing units of the plurality of processing units have currently cached instructions from the page of primary code;
checking in a first message queue of the first processing unit for a first notification message received from a second processing unit of the plurality of processing units indicating potential storing to the page of primary code by the second processing unit, and responsive to the first notification message being present in the first message queue, invalidating cached instructions from the page of primary code in the cache associated with the first processing unit; and
executing by the first processing unit cached instructions, wherein the executing comprises fetching from the cache a next instruction to be executed and checking whether the next instruction is a store instruction that modifies one or more instructions of the page of primary code, and responsive to the checking indicating that the next instruction is a store instruction, referencing the entry of the table in the memory storage unit to ascertain which processing units of the plurality of processing units have currently cached instructions from the page of primary code and forwarding a second notification message to at least one of the processing units having currently cached instructions from the page of primary code reporting a modification by the first processing unit to the page of primary code, thereby facilitating cache coherency across the plurality of processing units without requiring a cache coherency search of a cache associated with another processing unit of the plurality of processing units.

2. The method of claim 1, further comprising:
sending a request message to the second processing unit to complete storage to the page of primary code and reset write permission; and
receiving a response message from the second processing unit indicating completion of storage to the page of primary code by the second processing unit and resetting of write permission.

3. The method of claim 1, wherein the entry of the table in the memory storage unit reflects that the first processing unit has currently cached data from the page of primary code stored in the memory storage unit.

4. The method of claim 1, further comprising translating primary code in into cached instructions.

5. In a computer system, a method comprising:
caching instructions in a cache associated with a first processing unit of a plurality of processing units from a page of a memory storage unit, the caching comprising modifying an entry of a table in the memory storage unit indicating which processing units of the plurality of processing units have currently cached instructions from the page of the memory storage unit;
storing code by a second processing unit to the page of the memory storage unit;
referencing by the second processing unit the entry of the table in the memory storage unit and determining that that the first processing unit has currently cached instructions from the page of the memory storage unit; and
forwarding, by the second processing unit, a notification message to the first processing unit indicating storing by the second processing unit to the page of the memory storage unit, thereby facilitating cache coherency across the first processing unit and second processing unit without requiring a cache coherency search of the cache associated with the first processing unit.

6. The method of claim 5, further comprising purging a first translation lookaside buffer associated with the second processing unit if the table in the memory storage unit indicates a synonym of the page the memory storage unit is present.

7. The method of claim 5, further comprising:
receiving, by the second processing unit, a request message from the first processing unit to complete storage to the page of the memory storage unit and reset write permission;
completing storage, by the second processing unit, to the page of the memory storage unit;

resetting write permission by the second processing unit; and sending a response message to the first processing unit by the second processing unit.

8. The method of claim 7, further comprising resetting write permission by the second processing unit by resetting a dirty bit associated with the page of the memory storage unit, the dirty bit being in a translation lookaside buffer associated with the second processing unit.

9. A set of instructions residing in a non-transitory tangible storage medium, said set of instructions capable of being executed by a storage controller to implement a method for processing data, the method comprising:

caching instructions in a cache associated with a first processing unit of a plurality of processing units of the computer system from a page of primary code stored in a memory storage unit, the caching comprising modifying an entry of a table in the memory storage unit indicating which processing units of the plurality of processing units have currently cached instructions from the page of primary code;

checking in a first message queue of the first processing unit for a first notification message received from a second processing unit of the plurality of processing units indicating potential storing to the first page of primary code by the second processing unit, and responsive to the first notification message being present in the first message queue, invalidating cached instructions from the page of primary code in the cache associated with the first processing unit; and executing by the first processing unit cached instructions, wherein the executing comprises fetching from the cache a next instruction to be executed and checking whether the next instruction is a store instruction that modifies one or more instructions of the page of primary code, and responsive to the checking indicating that the next instruction is a store instruction, referencing the entry of the table in the memory storage unit to ascertain which processing units of the plurality of processing units have currently cached instructions from the page of primary code and forwarding a second notification message to at least one of the processing units having currently cached instructions from the page of primary code reporting a modification by the first processing unit to the page of primary code, thereby facilitating cache coherency across the plurality of processing units without requiring a cache coherency search of a cache associated with another processing unit of the plurality of processing units.

10. The set of instructions of claim 9, further comprising:
sending a request message to the second processing unit to complete storage to the first page and reset write permission; and receiving a response message from the second processing unit indicating completion of storage to the first page by the second processing unit and resetting of write permission.

11. The set of instructions of claim 9, wherein the entry of the table in the memory storage unit reflects that the first processing unit has currently cached data from the page of primary code stored in the memory storage unit.

12. The set of instructions of claim 9, further comprising translating primary code in into cached instructions.

13. A set of instructions residing in a non-transitory tangible storage medium, said set of instructions capable of being executed by a storage controller to implement a method for processing data, the method comprising:

caching instructions in a cache associated with a first processing unit of a plurality of processing units from a page of a memory storage unit, the caching comprising modifying an entry of a table in the memory storage unit indicating which processing units of the plurality of processing units have currently cached instructions from the page of the memory storage unit;

storing code by a second processing unit to the page of the memory storage unit;

referencing by the second processing unit the entry of the table in the memory storage unit and determining that that the first processing unit has currently cached instructions from the first page of the memory storage unit; and forwarding, by the second processing unit, a notification message to the first processing unit indicating storing by the second processing unit to the page of the memory storage unit, thereby facilitating cache coherency across the first processing unit and second processing unit without requiring a cache coherency search of the cache associated with the first processing unit.

14. The set of instructions of claim 13, further comprising purging a translation lookaside buffer associated with the second processing unit if the table in the memory storage unit indicates a synonym of the page the memory storage unit is present.

15. The set of instructions of claim 13, further comprising:
receiving, by the second processing unit, a request message from the first processing unit to complete storage to the page of the memory storage unit and reset write permission;

completing storage, by the second processing unit, to the page of the memory storage unit;

resetting write permission by the second processing unit; and sending a response message to the first processing unit by the second processing unit.

16. The set of instructions of claim 15, further comprising resetting write permission by the second processing unit by resetting a dirty bit associated with the page of the memory storage unit, the dirty bit being in a translation lookaside buffer associated with the second processing unit.

17. A computer system comprising:
a memory storage unit storing a first page of primary code;
a first processing unit of a plurality of processing units of the computer system, the first processing unit:
caching instructions in a first cache from the page of primary code, the caching comprising modifying an entry of a table in the memory storage unit indicating which processing units of the plurality of processing units have currently cached instructions from the page of primary code; and a second processing unit of the plurality of processing units, the second processing unit:
caching instructions in a second cache from the page of primary code, the caching comprising modifying the entry of the table in the memory storage unit indicating which processing units of the plurality of processing units have currently cached instructions from the page of primary code;

storing code to the page of primary code: and
referencing the entry of the table in the memory storage unit and determining that the first processing unit has currently cached instructions from the page of primary code, and forwarding a first notification message to the first processing unit indicating storing by the second processing unit to the page of primary code, wherein responsive to the notification message being present in the message queue of the first processing unit, the first processing unit invalidates cached instructions in the first cache, thereby facilitating cache coherency across the first processing unit and the second processing unit without requiring a cache coherency search of the first processing unit.

18. The computer system of claim 17, wherein the notification message is forwarded to a message queue of the first processing unit, the message queue only receiving notification messages indicating storing to a page of primary code by another processing unit.

19. The computer system of claim 17, wherein the first processing unit sends a request message to the second central processing unit to complete storage to the first page of primary code and reset write permission and the second processing unit sends a response message from the second central processing unit to the first processing unit indicating completion of storage to the page of primary code by the second processing unit and resetting of write permission.

20. The computer system of claim 19, wherein the response message is received in a second message queue of the first processing unit.

21. The computer system of claim 17, wherein the table in the memory storage unit comprises entries that reflect whether pages of primary code of the memory storage unit are being read from or written to.

22. The computer system of claim 17, wherein a first translation lookaside buffer associated with the first processing unit and a second translation lookaside buffer associated with the second processing unit are purged if the table in the memory storage unit indicates a synonym of the page of primary code is present.

23. In a computer system, a method comprising:
mapping in a first translation lookaside buffer entry a first virtual address to an absolute address of a stored in a memory storage unit;
mapping, in an absolute page storage map entry of an absolute page storage map stored in the memory storage unit, the absolute address with the first virtual address;
executing instructions from a cache by a first processing unit, the instructions being cached from the page;
mapping in a second translation lookaside buffer entry a second virtual address to the absolute address of the page;
indicating with a synonym value of the absolute page storage map entry whether the second virtual address matches the first virtual address; and
if the synonym value indicates the second virtual address matches the first virtual address, detecting potential storing to the page;
if the synonym value indicates the second virtual address does not match the first virtual address, invalidating all translation lookaside buffer entries from the page and cached instructions from the first page.

24. The method of claim 23, wherein the absolute page storage map entry maps multiple virtual addresses, and the synonym value indicates whether the second virtual address is one of the virtual addresses mapped in the absolute page storage map entry.

25. The method of claim 23, wherein the first translation lookaside buffer entry and the second translation lookaside buffer entry are in a first translation lookaside buffer.

26. The method of claim 23, wherein the first translation lookaside buffer entry is in a first translation lookaside buffer and the second translation lookaside buffer entry is in a second translation lookaside buffer.

* * * * *